(12) United States Patent
Marru et al.

(10) Patent No.: US 12,529,856 B2
(45) Date of Patent: Jan. 20, 2026

(54) OPTICAL FIBRE CABLE WITH MULTI LAYERED TUBES

(71) Applicant: Sterlite Technologies Limited, Haryana (IN)

(72) Inventors: Pramod Marru, Haryana (IN); Srinivas Pai, Haryana (IN)

(*) Notice: Subject to any disclaimer, the term of this patent is extended or adjusted under 35 U.S.C. 154(b) by 190 days.

(21) Appl. No.: 18/147,483

(22) Filed: Dec. 28, 2022

(65) Prior Publication Data

US 2023/0228960 A1 Jul. 20, 2023

(51) Int. Cl.
*G02B 6/44* (2006.01)

(52) U.S. Cl.
CPC ........... *G02B 6/4404* (2013.01); *G02B 6/441* (2013.01); *G02B 6/4432* (2013.01); *G02B 6/44384* (2023.05)

(58) Field of Classification Search
None
See application file for complete search history.

(56) References Cited

U.S. PATENT DOCUMENTS

| | | | | |
|---|---|---|---|---|
| 6,035,087 | A * | 3/2000 | Bonicel | G02B 6/441 385/112 |
| 7,382,955 | B1 * | 6/2008 | Keller | G02B 6/441 385/100 |
| 2003/0118299 | A1 * | 6/2003 | Seddon | G02B 6/4413 385/112 |
| 2007/0274647 | A1 * | 11/2007 | Pizzorno | G02B 6/441 385/103 |
| 2010/0067856 | A1 * | 3/2010 | Knoch | G02B 6/4429 385/113 |
| 2014/0112630 | A1 * | 4/2014 | Hennink | G02B 6/441 385/113 |
| 2018/0059350 | A1 * | 3/2018 | Carberry | B23K 26/364 |
| 2020/0225436 | A1 * | 7/2020 | Kumar | G02B 6/566 |
| 2021/0302677 | A1 * | 9/2021 | Boxer | G02B 6/4434 |

* cited by examiner

*Primary Examiner* — Jerry Rahll
(74) *Attorney, Agent, or Firm* — Steven R. Fairchild

(57) ABSTRACT

The present invention relates to an optical fiber cable (100, 200, 300) comprising a plurality of tubes (104) and a sheath (114) encapsulating the plurality of tubes (104) with a plurality of optical fibers (106). At least one tube of the plurality of tubes (104) has young's modulus that is different from other tubes and the young's modulus that is at least 30% more than young's modulus of the other tubes. In particular, the plurality of tubes (104) is arranged in an innermost layer (108) and an outermost layer (110). Additionally, young's modulus of the innermost layer (108) is greater than young's modulus of the outermost layer (110). Further, the diameter of the central strength member (102) is in a range of 1.5 millimetres to 6 millimetres.

19 Claims, 3 Drawing Sheets

100

300

OPTICAL FIBRE CABLE WITH MULTI LAYERED TUBES

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

CROSS REFERENCE TO RELATED APPLICATION

This application claims the benefit of Indian Patent Application No. 202211002806, entitled "OPTICAL FIBRE CABLE WITH MULTI LAYERED TUBES" filed by the applicant on Jan. 18, 2022, which is incorporated herein by reference in its entirety.

FIELD OF THE INVENTION

Embodiments of the present invention relate to the field of optical fibre cable and more particularly, relate to an optical fibre cable with multi layered tubes.

BACKGROUND OF THE INVENTION

Telecommunications networks include access networks where end-user subscribers connect to service providers. With the advancement of science and technology, various modern technologies are being employed for communication purposes. Over the last few years, there has been a rapid rise in the development and usage of networking technology. This is particularly the case in the field of optical fiber cables and their applications.

Being a critical component of a modern communication network across the globe, optical fiber cables are widely used for communication to meet the increasing demands. Optical fiber cables utilize optical fibers to transmit signals such as voice, video, image, data or information. Optical fibers are strands of glass fiber processed so that light beams transmitted through the glass fiber are subject to total internal reflection wherein a large fraction of the incident intensity of light directed into the fiber is received at the other end of the fiber.

Two different types of optical fiber cables are ribbon cables and cables with individual optical fibers, either loose-tube, or tightly buffered. When designing and building networks, the advantages and disadvantages of these cables are weighed. In optical fiber cables including buffer tubes or loose tube for storing optical fibers, there may be multiple layers of buffer tubes. Optical fibers are typically enclosed in a plastic buffer tube having a bore of a cross-sectional area larger than the cross-sectional area of the fiber or fibers within it. This is referred to as a "loose" configuration.

A "loose-tube" optical fiber cable may include one or several buffer tubes, each containing one or a plurality of optical fibers. The plurality of optical fibers may be in the form of individual fibers, an optical fiber ribbon or a stack of optical fiber ribbons. Often, when a single buffer tube is employed (a "central tube" cable), strength members extending the length of the cable are embedded in the buffer tube or outer jacket. When multiple buffer tubes are employed (a "stranded loose tube" cable), they are typically arranged about a central strength member.

However, in the multi-layered buffer tube design, the buffer tubes positioned in the innermost layer of the multiple layers are subject to higher stresses as compared to the buffer tubes in the outermost layers. This leads to crushing of the buffer tubes in the innermost layer. Currently, there are a few patent applications providing multi-layered buffer tubes.

European patent application no. EP0833177A1 titled "High-fiber count optical fiber cable with enhanced flexibility" discloses a cable with enhanced flexibility. In particular, the cable includes materials with a lower modulus which are positioned closer to the outer periphery of the cable than the materials with a higher modulus to enhance flexibility. This means that the sheath has a lower modulus than buffer tubes and the buffer tubes have lower modulus than CSM.

US patent application no. US20050281517A1 titled "Multi-layered buffer tube for optical fiber cable" discloses a multi-layer buffer tube for a fiber optic cable comprising a radially inward first layer formed into an elongate cylinder, the first layer being formed of a first polymeric material and a radially outward second layer formed into an elongate cylinder that circumferentially overlies the radially inner layer, the second layer being formed of a second polymeric material that differs from the second material.

US patent application no. US20080145009A1 titled "Buffer tubes with improved flexibility" discloses a buffer tube for a communication cable, the buffer tube comprising a polymer mixture with a flexural modulus ranging from about 180 to about 380 kpsi.

However, there are a number of drawbacks in the current technologies providing multi-layered buffer tubes. In particular, the material used for the buffer tubes in the current technologies in the inner layers as well as the outer layers has a low young's modulus. Moreover, different buffer tube materials are used in inner layers and outer layers which leads to overdesigning of the optical fiber cables. Furthermore, the prior arts do not provide for different young's modulus of buffer tubes in different layers made of same material.

Accordingly, to overcome the disadvantages of the prior arts, there is a need for a technical solution that overcomes the above-stated limitations in the prior arts. The present invention provides an optical fibre cable with multi layered tubes of different modulus.

SUMMARY OF THE INVENTION

Embodiments of the present invention relate to an optical fiber cable comprising a plurality of tubes and a sheath encapsulating the plurality of tubes. In particular, each of the plurality of tubes has a plurality of optical fibers. Moreover, at least one tube of the plurality of tubes has young's modulus that is different from other tubes.

In accordance with an embodiment of the present invention, each of the plurality of tubes is made of a first material.

In accordance with an embodiment of the present invention, at least one tube of the plurality of tubes has a young's modulus that is at least 30% more than young's modulus of the other tubes.

In accordance with an embodiment of the present invention, the plurality of tubes are arranged in one or more inner layers and one or more outer layers. In particular, the one or more inner layers has an inner young's modulus. Moreover, each of the plurality of tubes in the one or more outer layers has an outer young's modulus such that the inner young's modulus of inner layer tubes is greater than the outer young's modulus of each of the plurality of tubes in the one or more outer layers.

In accordance with an embodiment of the present invention, the plurality of tubes is arranged in an innermost layer and an outermost layer. In particular, young's modulus of the innermost layer is greater than young's modulus of the outermost layer.

In accordance with an embodiment of the present invention, the plurality of tubes is arranged in an innermost layer, at least one intermediate layer and an outermost layer. In particular, young's modulus of the innermost layer tubes is greater than young's modulus of the intermediate layer and outermost layer tubes. Moreover, young's modulus of the at least one intermediate layer tubes is greater or equal to than young's modulus of the outermost layer tubes.

In accordance with an embodiment of the present invention, the plurality of tubes is arranged such that young's modulus of the plurality of tubes radially decreases from centre of the optical fiber cable towards the sheath of the optical fiber cable.

In accordance with an embodiment of the present invention, the optical fiber cable further comprises a central strength member. In particular, a first plurality of tubes of the plurality of tubes is stranded around the central strength member in a repetitive clockwise and anti-clockwise direction.

In accordance with an embodiment of the present invention, the optical fiber cable further comprises a central strength member. In particular, a first plurality of tubes of the plurality of tubes is stranded around the central strength member in a repetitive clockwise and anti-clockwise direction. Moreover, a second plurality of tubes of the plurality of tubes is stranded around the first plurality of tubes.

In accordance with an embodiment of the present invention, the optical fiber cable has one or more layers of binder yarns, strength yarns, WSY (water swellable yarns), WBT (water blocking tape), fire retardant tape, metal tape, cushioning layer in between layers of the plurality of tubes or in between the plurality of tubes and the sheath.

In accordance with an embodiment of the present invention, at least one tube of the plurality of tubes has a young's modulus that is at least 50% more than young's modulus of the other tubes In accordance with an embodiment of the present invention, the diameter of the central strength member is in a range of 1.5 millimetres to 6 millimetres.

In accordance with an embodiment of the present invention, young's modulus of the innermost layer is greater than 2000 MPa.

In accordance with an embodiment of the present invention, young's modulus of the at least one intermediate layer is greater than 1200 MPa.

In accordance with an embodiment of the present invention, young's modulus of the outermost layer is greater than 900 MPa.

In accordance with an embodiment of the present invention, each of the plurality of tubes have a thickness of 0.15 millimetre to 0.8 millimetre.

In accordance with an embodiment of the present invention, each of the plurality of tubes have an inner diameter of 0.9 millimetres to 3 mm millimetres.

In accordance with an embodiment of the present invention, each of the plurality of tubes have an outer diameter of 1.1 millimetres to 4.5 millimetres.

In accordance with an embodiment of the present invention, each of the plurality of optical fibers have a diameter of 160 um to 250 um.

In accordance with an embodiment of the present invention, the sheath has a thickness of 0.5 millimetre to 2.5 millimetre.

The foregoing objectives of the present invention are attained by providing an optical fibre cable with multi layered tubes.

BRIEF DESCRIPTION OF THE DRAWINGS

So that the manner in which the above-recited features of the present invention is understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The invention herein will be better understood from the following description with reference to the drawings, in which.

ELEMENT LIST

Optical fiber cable—100, 200, 300
Central strength member—102
Plurality of tubes—104
Plurality of optical fibers—106
Innermost layer—108
Outermost layer—110
Binding layer—112
Sheath—114
Plurality of water swellable yarns—116
Ripcord—118
At least one intermediate layer—120

The optical fiber cable is illustrated in the accompanying drawings, which like reference letters indicate corresponding parts in the various figures. It should be noted that the accompanying figure is intended to present illustrations of exemplary embodiments of the present invention. This figure is not intended to limit the scope of the present invention. It should also be noted that the accompanying figure is not necessarily drawn to scale.

DETAILED DESCRIPTION OF THE INVENTION

Figure 1:
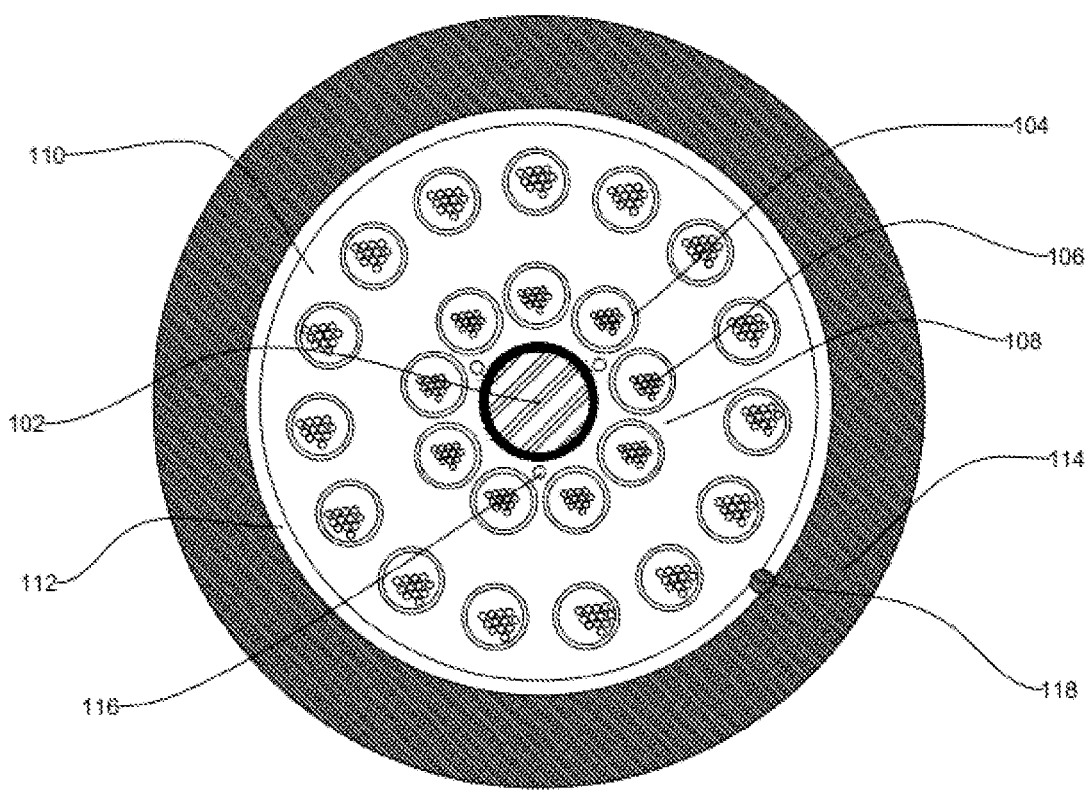
FIG. 1 is a snapshot illustrating an optical fibre cable with multi-layered tube design in accordance with one embodiment of the present invention.
Figure 2:
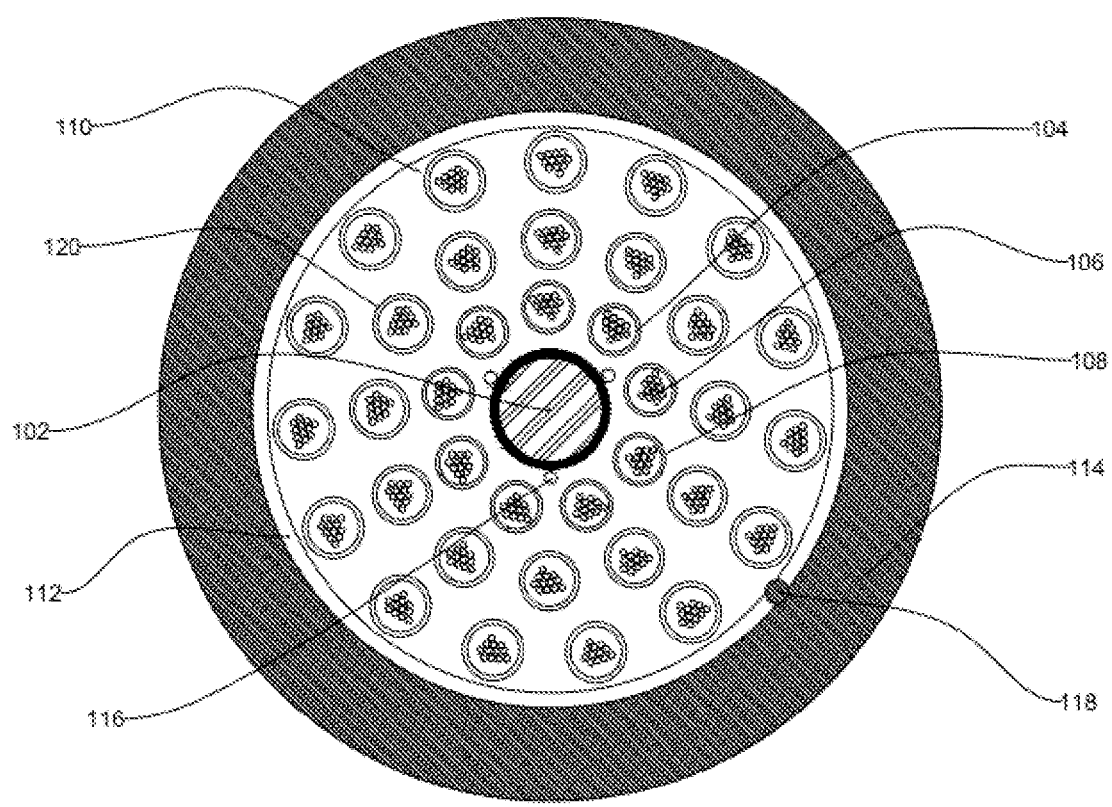
FIG. 2 is a snapshot illustrating another optical fiber cable with the multi-layered tube design in accordance with one embodiment of the present invention.
Figure 3:
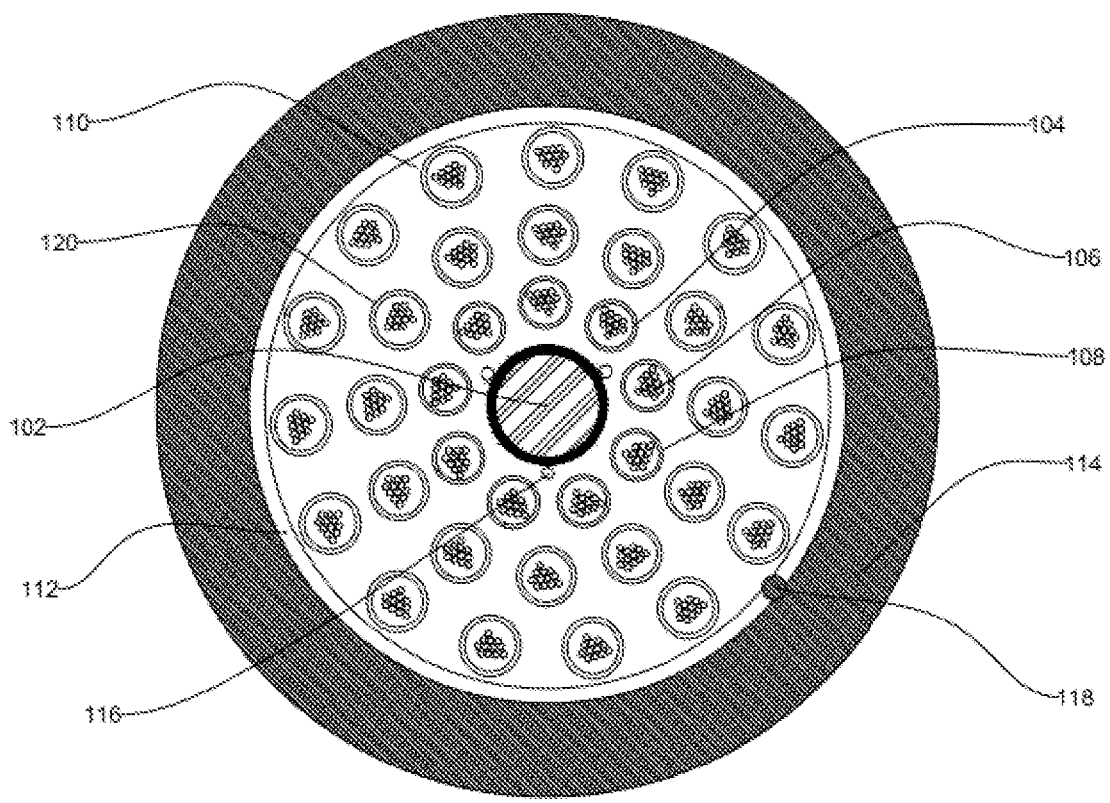
FIG. 3 is a snapshot illustrating yet another optical fiber cable with the multi-layered tube design in accordance with one embodiment of the present invention.

The principles of the present invention and their advantages are best understood by referring to FIG. 1 to FIG. 3. In the following detailed description, numerous specific details are set forth in order to provide a thorough understanding of the embodiment of the invention as illustrative or exemplary embodiments of the invention, specific embodiments in which the invention may be practised are described in sufficient detail to enable those skilled in the art to practice the disclosed embodiments. However, it will be obvious to a person skilled in the art that the embodiments of the invention may be practised with or without these specific details. In other instances, well-known methods, procedures and components have not been described in detail so as not to unnecessarily obscure aspects of the embodiments of the invention.

The following detailed description is, therefore, not to be taken in a limiting sense, and the scope of the present invention is defined by the appended claims and equivalents thereof. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. References within the specification to "one embodiment," "an embodiment," "embodiments," or "one or more embodiments" are intended to indicate that a particular feature, structure, or characteristic described in connection with the embodiment is included in at least one embodiment of the present invention.

Although the terms first, second, etc. may be used herein to describe various elements, these elements should not be limited by these terms. These terms are generally only used to distinguish one element from another and do not denote any order, ranking, quantity, or importance, but rather are used to distinguish one element from another. Further, the terms "a" and "an" herein do not denote a limitation of quantity, but rather denote the presence of at least one of the referenced items.

The conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The following brief definition of terms shall apply throughout the present invention:

Fiber reinforced plastic is a composite material having a polymer matrix reinforced with glass fibers.

Tensile strength is a resistance shown by the optical fiber cable 100 against longitudinal loads.

Lay length is a longitudinal distance along the length of the central strength member 102 required for the plurality of tubes 104 to go all the way around the central strength member 102.

Young's modulus (E) is a property of the material that tells how easily it can stretch and deform. The young's modulus (E) is defined as a ratio of tensile stress ($\sigma$) to tensile strain ($\varepsilon$), where stress is the amount of force applied per unit area ($\sigma=F/A$) and strain is extension per unit length ($\varepsilon=dl/l$).

Medium density polyethylene is a thermoplastic material produced by chromium/silica catalysts, Ziegler-Natta catalysts or metallocene catalysts.

Referring to FIG. 1 illustrates a snapshot of an optical fibre cable 100 with multi-layered tube design in accordance with one embodiment of the present invention. The optical fiber cable 100, 200, 300 comprises a plurality of tubes 104 and a sheath 114 encapsulating the plurality of tubes 104. In particular, each of the plurality of tubes 104 has a plurality of optical fibers 106. Moreover, at least one tube of the plurality of tubes 104 has young's modulus that is different from other tubes.

Furthermore, the optical fiber cable 100 is used for telecommunication applications, networking applications requiring a small and flexible construction. The optical fiber cable 100 can be installed in ducts, riser shafts, conduits, plenums and computer room floors.

Further, the optical fiber cable 100 is a high fiber count optical fiber cable. The optical fiber cable 100 is a multi-layered tube design cable. The multi-layered tube design refers to multiple layers of tubes positioned inside a core of the optical fiber cable 100. Additionally, the optical fiber cable 100 comprises a plurality of tubes 104 and a sheath 114. Each of the plurality of tubes 104 encloses a plurality of optical fibers 106. And, the sheath 114 encapsulates the plurality of tubes 104.

In accordance with an embodiment of the present invention, the optical fiber cable 100 comprises a central strength member 102. The central strength member 102 lies substantially along a longitudinal axis of the optical fiber cable 100.

In an embodiment, the central strength member 102 is made of fiber reinforced plastic.

In an exemplary example, the fiber reinforced plastics may include but not limited to glass fibers, carbon fibers, aramid fibers, basalt fibers and the like. Alternatively, the central strength member 102 is made of any other suitable material.

In one embodiment, the central strength member 102 may be coated with a layer of polyethylene. Alternatively, the central strength member may be coated with any other suitable material.

In an alternate embodiment, the central strength member 102 may not be coated. The central strength member 102 has a circular cross-section.

Particularly, the central strength member 102 provides physical strength to the optical fiber cable 100 and resists over bending of the optical fiber cable 100. Moreover, the central strength member 102 provides tensile strength to the optical fiber cable 100. The central strength member 102 is characterized by a diameter measured along the cross section.

In an embodiment of the invention, the diameter of the central strength member 102 is 1.5 millimetres to 6 millimetres. Alternatively, the diameter of the central strength member 102 may vary.

In one embodiment, the plurality of tubes 104 includes a first plurality of tubes and a second plurality of tubes.

In another embodiment, the first plurality of tubes of the plurality of tubes 104 is stranded around the central strength member 102 in a repetitive clockwise and anti-clockwise direction.

In yet another embodiment of the invention, the second plurality of tubes of the plurality of tubes 104 is stranded around the first plurality of tubes.

In accordance with an embodiment of the present invention, the optical fiber cable 100 comprises a first layer of tubes and a second layer of tubes.

In an embodiment of the invention, the optical fiber cable 100 comprises a first layer of tubes, a second layer of tubes and a third layer of tubes. In particular, the first layer of tubes, the second layer of tubes and the third layer of tubes may be stranded in an S-Z fashion. The first layer of tubes wound around the central strength member 102 in sections with a first direction of winding in an S-shape alternating with the sections with a second direction of winding in a Z-shape. Moreover, the first direction is a clockwise direction and the second direction is an anticlockwise direction. Furthermore, the SZ stranding of the plurality of tubes 104 is performed in order to maintain a uniform lay length, mid-spanning and achieve higher production speeds as compared to helical stranding. Further, the S-Z stranding allows uniform distribution of the stress across the plurality of tubes 104. The S-Z stranding may have any number of turns between the S-shape and the Z-shape.

Further, at least one tube of the plurality of tubes 104 has young's modulus that is different from other tubes.

In an embodiment of the invention, at least one tube of the plurality of tubes 104 has a young's modulus that is at least 30% more than young's modulus of the other tubes.

In another embodiment, at least one tube of the plurality of tubes 104 has a young's modulus that is at least 50% more than young's modulus of the other tubes. Moreover, the optical fiber cable 100 comprises the plurality of tubes 104 of different young's modulus.

In another embodiment of the invention, each of the plurality of tubes 104 is made of a first material.

In yet another embodiment, the first material includes polypropylene, polybutylene terephthalate or a mixture of polycarbonate and polybutylene terephthalate. Alternatively, the first material may be any other suitable material.

In yet another embodiment of the present invention, the plurality of tubes 104 is arranged in one or more inner layers and one or more outer layers. The tubes in one or more inner layers have an inner young's modulus. Moreover, each of the plurality of tubes 104 in the one or more outer layers has an outer young's modulus such that the inner young's modulus is greater than the outer young's modulus of each of the plurality of tubes 104 in the one or more outer layers.

In accordance with an embodiment of the present invention, the optical fiber cable 100 comprises tubes of same raw material but different grades such that the plurality of tubes 104 in the one or more inner layers have a higher young's modulus as compared to the plurality of tubes 104 in the one or more outer layers. Particularly, the plurality of tubes 104 in the one or more inner layers and the one or more outer layers although made up of same base plastic material have different mechanical properties.

In embodiment of the invention, the plurality of tubes 104 is arranged in an innermost layer 108 and an outermost layer 110. In particular, the young's modulus of the innermost layer 108 is greater than the young's modulus of the outermost layer 110.

In another embodiment, the plurality of tubes 104 is arranged in the innermost layer 108, at least one intermediate layer 120 and the outermost layer 110.

In yet another embodiment of the invention, the young's modulus of the innermost layer 108 is greater than the young's modulus of the intermediate layer 120 and outermost layer 110.

In yet another embodiment, the young's modulus of the at least one intermediate layer 120 is greater or equal to the young's modulus of the outermost layer 110.

In accordance with an embodiment of the present invention, the plurality of tubes 110 is arranged such that the young's modulus of the plurality of tubes 104 radially decreases from centre of the optical fiber cable 100 towards the sheath 114 of the optical fiber cable 100.

In one embodiment, the young's modulus of the innermost layer 108 is greater than 2000 MPa.

In another embodiment, the young's modulus of the at least one intermediate layer 120 is greater than 1200 MPa.

In yet another embodiment of the invention, the young's modulus of the outermost layer 110 is greater than 900 MPa.

Moreover, the cross section of each of the plurality of tubes 104 is circular in shape. Alternatively, the cross section of each of the plurality of tubes 104 may be of any suitable shape.

In one embodiment of the invention, each of the plurality of tubes 104 has a uniform structure and dimensions.

In an embodiment, the innermost layer 108 includes 9 tubes. Alternatively, the number of tubes inside the innermost layer 108 may vary.

In another embodiment, the at least one intermediate layer 120 includes 12 tubes. Alternatively, the number of tubes inside the at least one intermediate layer 120 may vary.

In yet another embodiment, the outermost layer 110 includes 15 tubes. Alternatively, the number of tubes inside the outermost layer 110 may vary.

Furthermore, each of the plurality of tubes 104 has a thickness.

In an embodiment of the present invention, the thickness of each of the plurality of tubes 104 is equal.

In another embodiment, the thickness of each of the plurality of tubes 104 is 0.15 millimetre to 0.8 millimetre. Alternatively, the thickness of each of the plurality of tubes 104 may vary.

Further, each of the plurality of tubes 104 has an inner diameter and an outer diameter.

In yet another embodiment of the invention, the inner diameter and the outer diameter of each of the plurality of tubes 104 is fixed.

In yet another embodiment, the inner diameter of each of the plurality of tubes 104 is 0.9 millimetres to 3 mm millimetres. Alternatively, the inner diameter of each of the plurality of tubes 104 may vary.

In yet another embodiment, the outer diameter of each of the plurality of tubes 104 is 1.1 millimetres to 4.5 millimetres. Alternatively, the outer diameter of each of the plurality of tubes 104 may vary.

Additionally, each of the plurality of tubes 104 encloses a plurality of optical fibers 106.

In an embodiment, each of the plurality of tubes 104 encloses 12 optical fibers. Each of the plurality of tubes 104 is a tube for encapsulating the plurality of optical fibers 106. Moreover, the plurality of tubes 104 provides support and protection to each of the plurality of optical fibers 106 against crush, bend and stretch. Furthermore, the plurality of tubes 104 protects the plurality of optical fibers 106. Further, each of the plurality of tubes 104 provides mechanical isolation, physical damage protection and identification of each of the plurality of optical fibers 106.

In accordance with an embodiment of the present invention, each of the plurality of tubes 104 is filled with a gel.

In one embodiment of the invention, the gel is a thixotropic gel. The thixotropic gel prevents ingression of water inside each of the plurality of tubes 104.

In another embodiment, each of the plurality of tubes 104 includes water swellable yarns. The water swellable yarns prevent ingression of water inside the plurality of tubes 104.

In yet another embodiment, the plurality of tubes 104 may be loose tubes, buffer tubes and tight buffered tubes.

In accordance with an embodiment of the present invention, the plurality of optical fibers 106 may be in the form of loose fibers.

In one embodiment of the invention, the plurality of optical fibers 106 may be in the form of flat ribbons.

In alternate embodiment, the plurality of optical fibers 106 may be in the form of rollable ribbons.

In another embodiment, the plurality of optical fibers 106 may be in the form of intermittently bonded ribbon. Moreover, each of the plurality of optical fibers 106 is a fiber used for transmitting information as light pulses from one end to another. Furthermore, each of the plurality of optical fibers 106 is a thin strand of glass capable of transmitting optical signals. Further, each of the plurality of optical fibers 106 is configured to transmit large amounts of information over long distances with relatively low attenuation. Additionally, each of the plurality of optical fibers 106 includes a core region and a cladding region. The core region is an inner part of an optical fiber and the cladding section is an outer part of the optical fiber. And, the core region is defined by a central longitudinal axis of each of the plurality of optical fibers 106. The cladding region surrounds the core region.

Further, each of the plurality of optical fibers 106 has a diameter of 160 um to 250 um Alternatively, the diameter of each of the plurality of optical fibers 106 may vary.

In an embodiment of the invention, each of the plurality of optical fibers 106 is a single mode fiber.

In another embodiment, each of the plurality of optical fibers 106 is a multimode fiber.

In accordance with an embodiment of the present invention, a number of the plurality of optical fibers 106 in each of the plurality of tubes 104 is 12.

In an embodiment, a number of the plurality of optical fibers 106 in each of the plurality of tubes 104 is 24.

In another embodiment of the invention, a total number of the plurality of optical fibers 106 in the innermost layer 108 is 108 (9*12=108), when the number of tubes is 9. Alternatively, the number of optical fibers and the number of tubes in the innermost layer 108 may vary.

In another embodiment, a total number of the plurality of optical fibers 106 in the at least one intermediate layer 120 is 144 (12*12=144), when the number of tubes is 12. Alternatively, the number of optical fibers and the number of tubes in the at least one intermediate layer 120 may vary.

In yet another embodiment of the invention, a total number of the plurality of optical fibers 106 in the outermost layer 110 is 180 (15*12=180), when the number of tubes is 15. Alternatively, the number of optical fibers and the number of tubes in the outermost layer 108 may vary.

In accordance with an embodiment of the present invention, the optical fiber cable 100 has one or more layers of binder yarns, strength yarns, WSY (water swellable yarns), WBT (water blocking tape), fire retardant tape, metal tape, cushioning layer and the like in between layers of the plurality of tubes (104) or in between the plurality of tubes (104) and the sheath (114).

In one embodiment, the optical fiber cable 100 comprises a binding layer 112.

The binding layer 112 is made of binder yarns. Particularly, the binder yarn is used for binding of the core of the optical fiber cable 100.

In an embodiment of the invention, the binder yarn is a normal binder yarn.

In another embodiment, the binder yarn is a low shrinkage binder yarn.

In yet another embodiment of the invention, the binder yarn is a super low shrinkage binder yarn.

In yet another embodiment, the binder yarn is an aramid yarn. Alternatively, the binder yarn is made of any other suitable material. Moreover, the optical fiber cable 100 may include more layers in addition or in place of the binding layer 112.

In accordance with an embodiment of the present invention, the optical fiber cable 100 comprises the sheath 114. The sheath 114 encapsulates the plurality of tubes 104.

In an embodiment of the invention, the sheath 114 encapsulates the one or more layers surrounding the plurality of tubes 104.

In another embodiment, the sheath 114 is made of one of UV proof black medium density polyethylene material and UV proof black high density polyethylene material.

In yet another embodiment, the sheath 114 may be made of any other suitable material. The sheath 114 protects the optical fiber cable 100 from harsh environment and harmful UV rays. Moreover, the sheath 114 has the inherent ability to resist crushes, kinks and tensile stress.

In yet another embodiment of the invention, the sheath 114 has a thickness of about 0.5 to 2.5 millimetre. Alternatively, the sheath 114 may have any suitable thickness.

In accordance with an embodiment of the present invention, the optical fiber cable 100 comprises a plurality of water swellable yarns 116. The plurality of water swellable yarns 116 prevents ingression of water inside the core of the optical fiber cable 100. Moreover, the water swellable yarns 116 prevent water penetration along the length of the optical fiber cable 100. Furthermore, the plurality of water swellable yarns 116 may be helically disposed around the central strength member 102.

In one embodiment, number of the plurality of water swellable yarns 116 is 3. Alternatively, the number of the plurality of water swellable yarns 116 may vary.

In accordance with an embodiment of the present invention, the optical fiber cable 100 comprises the ripcord 118.

In an embodiment of the invention, the ripcord 118 is disposed inside the binding layer 120. The ripcord 118 lies substantially along the longitudinal axis of the optical fiber cable 100. Moreover, the ripcord 118 enables tearing of the sheath 114 to facilitate access to the plurality of tubes 104.

In another embodiment, the ripcord 118 is made of a polyester material. Alternatively, the ripcord 118 is made of any other suitable material. Furthermore, the ripcord 118 has a circular cross-section.

In yet another embodiment, the number of ripcords in the optical fiber cable 100 is 1. Alternatively, the number of ripcords may vary.

In accordance with an embodiment of the present invention, the optical fiber cable 100 may have a suitable diameter.

In an embodiment of the present invention, the diameter of the optical fiber cable 100 is 8 millimeters to 25 millimeters. Moreover, the optical fiber cable 100 has better crush resistant tubes in the innermost layer 108. Furthermore, the use of same material with different grades helps avoid overdesigning of the optical fiber cable 100. Further, the optical fiber cable 100 has reduced cost.

The present invention of an optical fibre cable 100, 200, 300 with multi layered tubes provides a number of advantages. The present invention provides an optical fibre cable with multiple layers of tubes. Moreover, the present invention provides better crush resistant tubes in the inner layer. Furthermore, the present invention avoids overdesigning of the optical fiber cable by using tubes of same material.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

We claim:

1. An optical fiber cable (100, 200, 300) comprising:
a plurality of tubes (104), wherein each of the plurality of tubes (104) has a plurality of optical fibers (106), wherein at least one tube of the plurality of tubes (104) has young's modulus that is different from other tubes; and
a sheath (114) encapsulating the plurality of tubes (104) wherein the plurality of tubes (104) are arranged in one or more inner layers and one or more outer layers, wherein the one or more inner layers has an inner young's modulus, wherein each of the plurality of tubes (104) in the one or more outer layers has an outer young's modulus such that the inner young's modulus of inner layer tubes is greater than the outer young's modulus of each of the plurality of tubes (104) in the one or more outer layers.

2. The optical fiber cable (100, 200, 300) as claimed in claim 1, wherein each of the plurality of tubes (104) is made of a first material.

3. The optical fiber cable (100, 200, 300) as claimed in claim 1, wherein at least one tube of the plurality of tubes (104) has a young's modulus that is at least 30% more than young's modulus of the other tubes.

4. The optical fiber cable (100, 200, 300) as claimed in claim 1, wherein the plurality of tubes (104) is arranged in an innermost layer (108) and an outermost layer (110), wherein young's modulus of the innermost layer (108) is greater than young's modulus of the outermost layer (110).

5. The optical fiber cable (100, 200, 300) as claimed in claim 1, wherein the plurality of tubes (104) is arranged in an innermost layer (108), at least one intermediate layer (120) and an outermost layer (110), wherein young's modulus of the innermost layer (108) tubes is greater than young's modulus of the intermediate layer (12) and outermost layer (110) tubes, wherein young's modulus of the at least one intermediate layer (120) tubes is greater or equal to than young's modulus of the outermost layer (110) tubes.

6. The optical fiber cable (100, 200, 300) as claimed in claim 1, wherein the plurality of tubes (110) is arranged such that young's modulus of the plurality of tubes (104) radially decreases from centre of the optical fiber cable (100, 200, 300) towards the sheath (114) of the optical fiber cable (100, 200, 300).

7. The optical fiber cable (100, 200, 300) as claimed in claim 1, further comprising a central strength member (102), wherein a first plurality of tubes of the plurality of tubes (104) is stranded around the central strength member (102) in a repetitive clockwise and anti clockwise direction.

8. The optical fiber cable (100, 200, 300) as claimed in claim 1, further comprising a central strength member (102), wherein a first plurality of tubes of the plurality of tubes (104) is stranded around the central strength member (102) in a repetitive clockwise and anti clockwise direction, wherein a second plurality of tubes of the plurality of tubes (104) is stranded around the first plurality of tubes.

9. The optical fiber cable (100, 200, 300) as claimed in claim 1, wherein the optical fiber cable (100, 200, 300) has one or more layers of binder yarns, strength yarns, WSY (water swellable yarns), WBT (water blocking tape), fire retardant tape, metal tape, cushioning layer in between layers of the plurality of tubes (104) or in between the plurality of tubes (104) and the sheath (114).

10. The optical fiber cable (100, 200, 300) as claimed in claim 1, wherein at least one tube of the plurality of tubes (104) has a young's modulus that is at least 50% more than young's modulus of the other tubes.

11. The optical fiber cable (100, 200, 300) as claimed in claim 1, wherein the diameter of the central strength member (102) is in a range of 1.5 millimetres to 6 millimetres.

12. The optical fiber cable (100, 200, 300) as claimed in claim 1, wherein young's modulus of the innermost layer (108) is greater than 2000 MPa.

13. The optical fiber cable (100, 200, 300) as claimed in claim 1, wherein young's modulus of the at least one intermediate layer (120) is greater than 1200 MPa.

14. The optical fiber cable (100, 200, 300) as claimed in claim 1, wherein young's modulus of the outermost layer (110) is greater than 900 MPa.

15. The optical fiber cable (100, 200, 300) as claimed in claim 1, wherein each of the plurality of tubes (104) have a thickness of 0.15 millimetre to 0.8 millimetre.

16. The optical fiber cable (100, 200, 300) as claimed in claim 1, wherein each of the plurality of tubes (104) have an inner diameter of 0.9 millimetres to 3 mm millimetres.

17. The optical fiber cable (100, 200, 300) as claimed in claim 1, wherein each of the plurality of tubes (104) have an outer diameter of 1.1 millimetres to 4.5 millimetres.

18. The optical fiber cable (100, 200, 300) as claimed in claim 1, wherein each of the plurality of optical fibers (106) have a diameter of 160 μm to 250 μm.

19. The optical fiber cable (100, 200, 300) as claimed in claim 1, wherein the sheath (114) has a thickness of 0.5 millimetre to 2.5 millimetre.

* * * * *